US009729346B2

(12) United States Patent
Assarpour et al.

(10) Patent No.: US 9,729,346 B2
(45) Date of Patent: Aug. 8, 2017

(54) METHOD FOR LAYER 2 FORWARDING IN A MULTI-NODE SWITCH CLUSTER

(75) Inventors: Hamid Assarpour, Arlington, MA (US); Shahaji Bhosle, Bedford, MA (US)

(73) Assignee: Avaya Inc., Basking Ridge, NJ (US)

( * ) Notice: Subject to any disclaimer, the term of this patent is extended or adjusted under 35 U.S.C. 154(b) by 430 days.

(21) Appl. No.: 13/539,216

(22) Filed: Jun. 29, 2012

(65) Prior Publication Data
US 2014/0003423 A1 Jan. 2, 2014

(51) Int. Cl.
*H04L 12/46* (2006.01)
(52) U.S. Cl.
CPC ................... *H04L 12/462* (2013.01)
(58) Field of Classification Search
CPC .................................................. H04L 12/462
USPC ........................................ 370/389, 390, 392
See application file for complete search history.

(56) References Cited

U.S. PATENT DOCUMENTS

| 7,266,122 | B1 * | 9/2007 | Hogg .................. H04L 12/5601 370/392 |
| 7,697,528 | B2 * | 4/2010 | Parry et al. .................... 370/392 |
| 8,213,300 | B1 * | 7/2012 | Osswald et al. ............... 370/218 |
| 2011/0128970 | A1 * | 6/2011 | Breton et al. .................. 370/463 |

* cited by examiner

*Primary Examiner* — Mohammad Anwar

(57) ABSTRACT

Each switch in a switch cluster is implemented as two logical switches—a logical UNI switch and a logical NNI switch implementing a Backbone Edge Bridge (BEB). The logical UNI switch handles forwarding to UNI receivers. The logical NNI switches are treated as independent switches by the SPB control plane and handle forwarding to NNI receivers. The two logical switches exchange packets through UNI/NNI and NNI/UNI translations (Mac-in-MAC encapsulation/decapsulation). The Inter-Switch Trunk is viewed as two logical channels—a UNI logical channel and an NNI logical channel. The logical UNI switch will forward packets having NNI receivers to the logical NNI switch. The logical NNI switch will forward packets having UNI receivers to the logical UNI switch only if the packet has a B-VID matching a B-VID assigned to the node of the switch cluster.

22 Claims, 4 Drawing Sheets

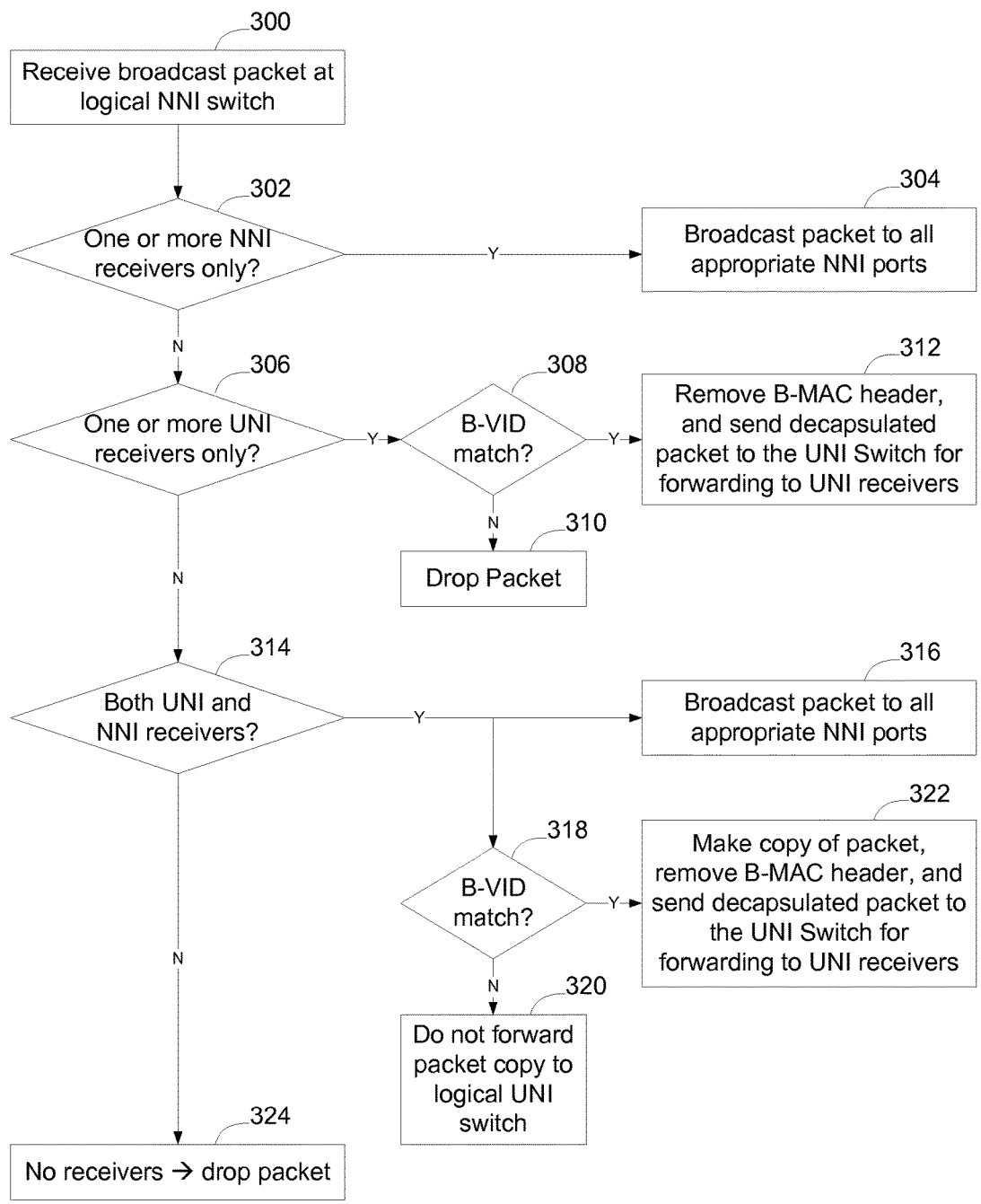

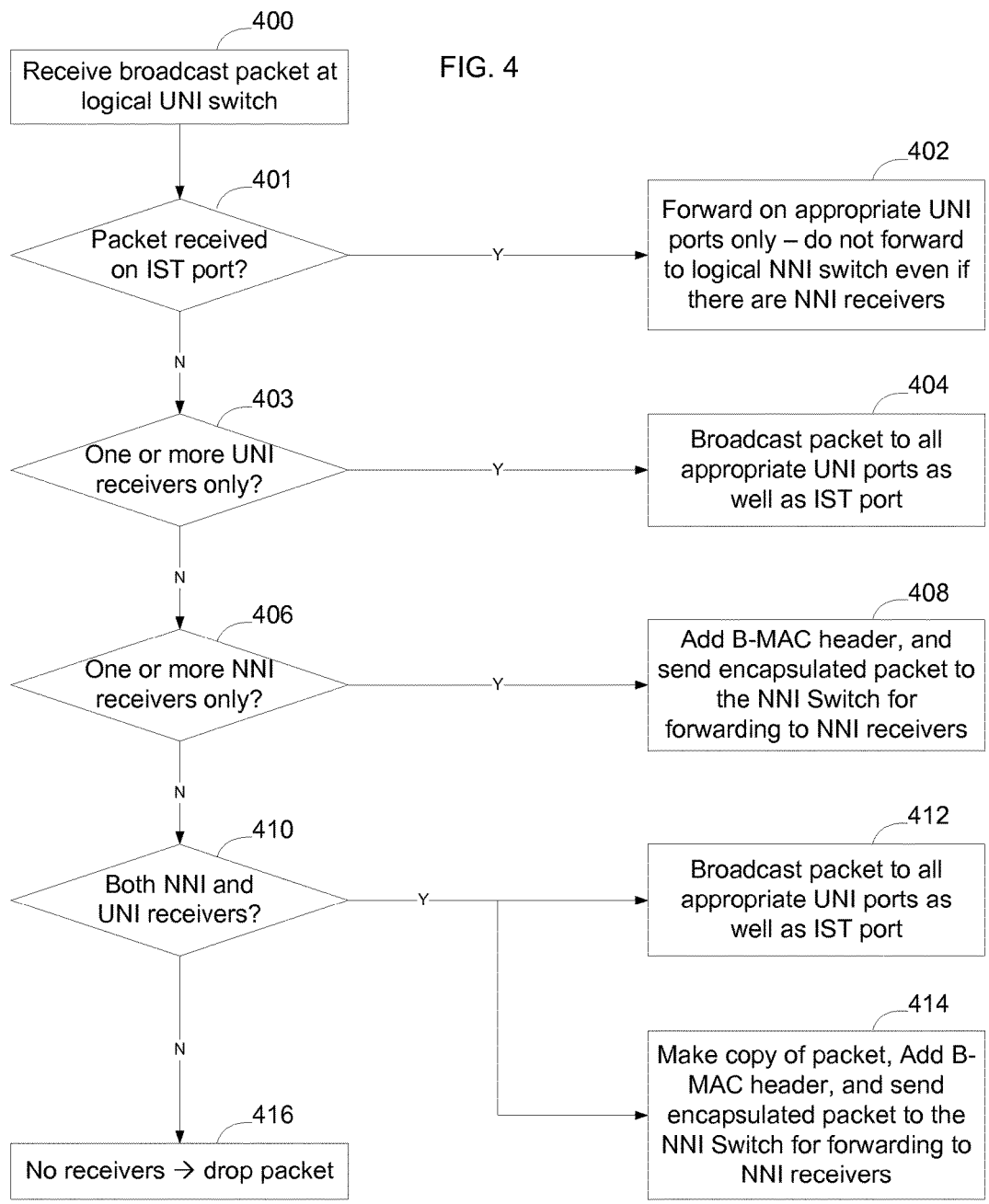

METHOD FOR LAYER 2 FORWARDING IN A MULTI-NODE SWITCH CLUSTER

CROSS-REFERENCE TO RELATED APPLICATIONS

None.

BACKGROUND

Field

This application relates to communication networks and, more particularly, to a method for layer 2 forwarding in a multi-node switch cluster.

Description of the Related Art

Data communication networks may include various computers, servers, hubs, switches, nodes, routers, other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

One way to make networks more reliable is to provide redundant connections between network elements using multiple physical links. A link aggregation group (LAG) or Multi-Link Trunk (MLT) of this nature is formed from two or more physical links that behave as one logical port. In this scenario, although physically the links are separate, logically they may be viewed as a single trunk by upper layers of the networking stack so that a failure of one of the links forming the logical trunk will not require corrective action at the link or networking layers. Rather, the network is able to accommodate a failure of one of the physical links by causing traffic to be shifted to one of the other links interconnecting the network elements. A link that is implemented in this manner will be referred to herein as a "multi-link trunk".

To further increase reliability, it is possible to cause the physical links implementing a multi-link trunk to be connected to different switches forming a switch cluster. A Multi-link trunk that has physical links connected to two or more switches of a switch cluster will be referred to herein as a "split multi-link trunk" or SMLT. In a triangular arrangement, on one end of the SMLT all the port members are connected to the same endpoint, and on the other end the port members are physically distributed across two or more access switches.

The switches at the split end of the SMLT are interconnected using a subset of their normal Input/Output (I/O) ports. The connection between the switches of the switch cluster is referred to herein as an Inter Switch Trunk (IST) and the ports that are used to communicate between the switches of the switch cluster are referred to as IST ports. The IST may be implemented using one or more physical links or may be implemented as a logical connection over one or more intervening nodes. Two switches connected via IST ports and providing SMLT connectivity form a layer 2 loop-free two-node resilient switch cluster.

All I/O ports that are not IST type are referred to as User I/O ports or User ports. Endpoint devices connect to the switch cluster using user ports. An endpoint device can connect to the switch cluster via either a single physical user port or a set of user ports via a LAG/MLT. When a single physical user port is used, the endpoint is connected to only one of the switches within the switch cluster. When a LAG/MLT or SMLT is used, the endpoint can be connected to one or more switches within the switch cluster.

Shortest Path Bridging (SPB), which has been implemented as IEEE 802.1aq, may be used to further scale the network and interconnect all the access switch clusters to provide a large flat layer 2 switch network without using the spanning tree protocol. When a switch cluster is connected between a SMLT and a SPB network, the switches of the switch cluster will have three types of ports: User to Network Interface (UNI) ports, Network to Network Interface (NNI) ports, and Inter-Switch Trunk (IST) ports. The UNI ports may be SMLT ports (where one or more of the links of the Split MLT connects to another switch of the switch cluster), LAG/MLT ports (where a trunk is formed from multiple links (Multi-Link Trunk) that all connect to the one switch), or single port (where the trunk is made up of a single physical link). With LAG/MLT and single port interfaces, there is not any dual-homing of the associated trunk, but rather all links (one or multiple) connect between an end device and the switch. With a SMLT some of the links of the MLT will connect between the end device and two or more of the switches of the switch group. The IST ports, as noted above, interconnect switches of the switch cluster.

The NNI ports are configured to interface the IEEE 802.1aq network and are hence used to forward traffic onto the SPB network to interconnect SMLT clusters or to connect to a next tier of switches with NNI ports. Commonly, traffic that is passed onto a SPB network will be encapsulated using an outer provider MAC header such that MAC-in-MAC encapsulation specified in IEEE 802.1ah is utilized within the SPB network.

Implementing a switch cluster to interface with both SMLT and 802.1 aq networks requires special design considerations and methods, particularly in connection with handling of layer 2 broadcast and unicast traffic. Particularly in connection with broadcast traffic, it is important to be cognizant of how traffic is handled in connection with the IST to allow traffic to be communicated between the switches without forming routing loops. Commonly, the IST ports are treated as NNI type only, and each node within the cluster is implemented as a monolithic switch that handles switch cluster and SPB interworking Unfortunately this is not straightforward in certain circumstances. For example, transitioning the switch cluster to support shortest path bridging (SPB) requires removal of the IST port membership (which is already configured on both switch nodes) from Customer Virtual Local Area Network (C-VLANs) on both nodes, which causes service interruptions to the customers. Accordingly it would be advantageous to provide a method for layer 2 forwarding in a multi-node switch cluster.

SUMMARY OF THE DISCLOSURE

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

Each switch in a switch cluster is implemented as two logical switches—a logical UNI switch and a logical NNI switch implementing a Backbone Edge Bridge (BEB). The logical UNI switch handles forwarding to UNI receivers. The logical NNI switches are treated as independent switches by the SPB control plane and handle forwarding to NNI receivers. The two logical switches exchange packets through UNI/NNI and NNI/UNI translations (Mac-in-MAC encapsulation/decapsulation). The Inter-Switch Trunk is viewed as two logical channels—a UNI logical channel and an NNI logical channel. The logical UNI switch will forward packets having NNI receivers to the logical NNI switch. The logical NNI switch will forward packets having UNI receivers to the logical UNI switch only if the packet has a B-VID matching a B-VID assigned to the node of the switch cluster.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIG. 3 is a flow diagram illustrating an example process implemented by the logical NNI switch when implementing layer 2 forwarding in a multi-node switch cluster according to an embodiment; and FIG. 4 is a flow diagram illustrating an example process implemented by the logical UNI switch when implementing layer 2 forwarding in a multi-node switch cluster according to an embodiment.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
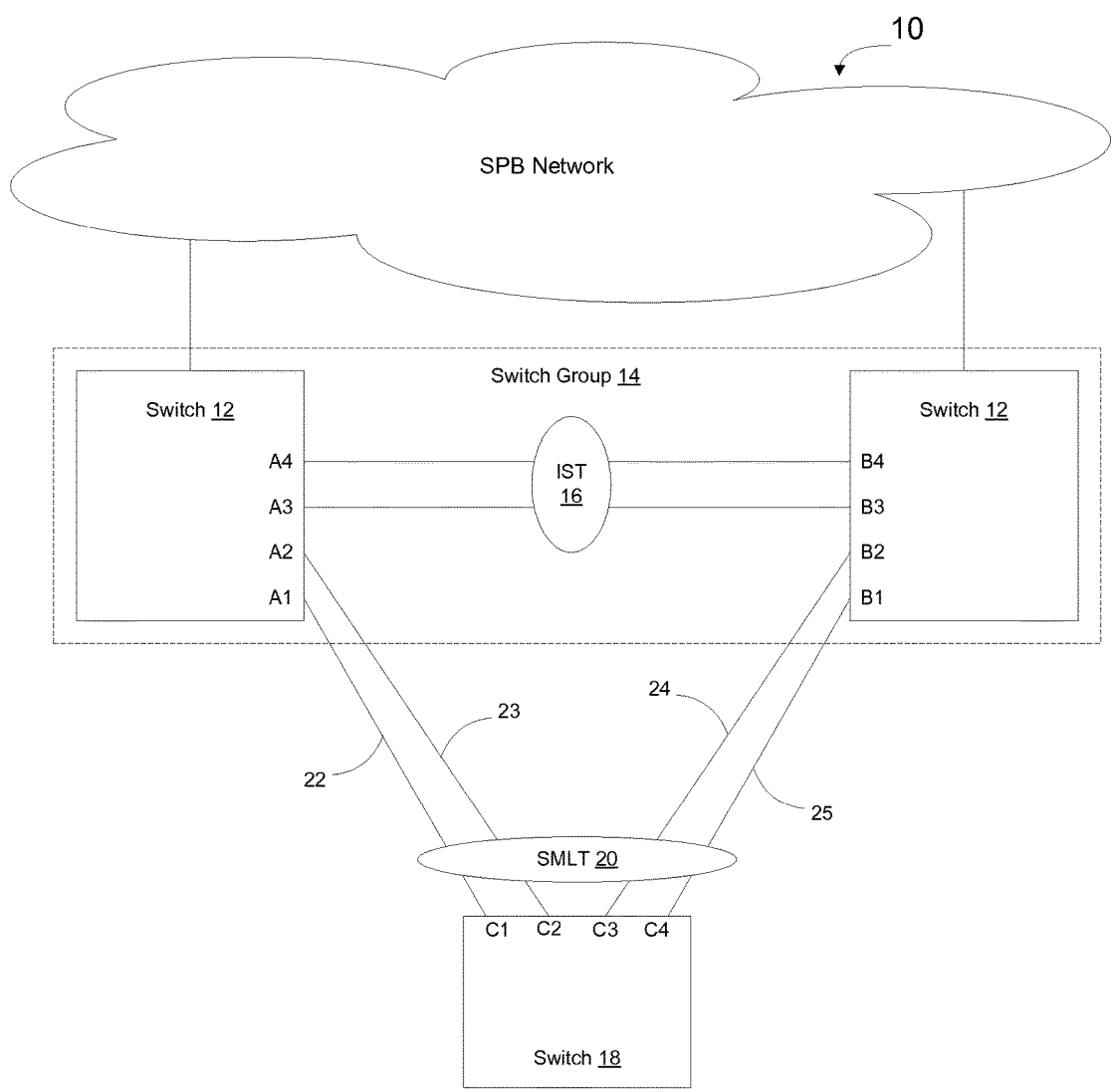
FIG. 1 is a functional block diagram of an example switch group interconnecting a user device to a Shortest Path Bridging (SPB) network via a triangular SMLT arrangement.

FIG. 1 illustrates an example of a network topology 10 in which a plurality of switches 12 form a switch group 14. The switches of the switch group are interconnected using an Inter-Switch Trunk (IST) 16, which may include one or more physical or logical links. Another switch 18 connects to each of the switches of the switch group 14 using a split multi-link trunk (SMLT) 20. In the illustrated example, switch 18 is connected to a first of the switches using links 22, 23, and is connected to a second of the switches using links 24, 25. Ports A1, A2, B1, and B2 on the switches 12 of the switch group connect to the links forming the SMLT. Ports A3, A4, B3, and B4 are IST ports in the illustrated example. A defining characteristic of a switch group, as that term is used herein, is that the switches 12 of a switch group 14 are interconnected using an inter-switch trunk which is treated differently than a normal user port by the switches in the switch group.

Although FIG. 1 shows one possible SMLT arrangement, in which one switch 18 is interconnected with two switches 12 forming a switch group 14, other configurations may be implemented as well. For example, the switch group 14 may include more than two switches 12. Likewise, the switch 18 may itself be implemented as a switch group. Although an example switch will be described which may be used in the relatively simple SMLT arrangement shown in FIG. 1, the switch may equally be used in one of these or other more complex SMLT arrangements.

Figure 2:
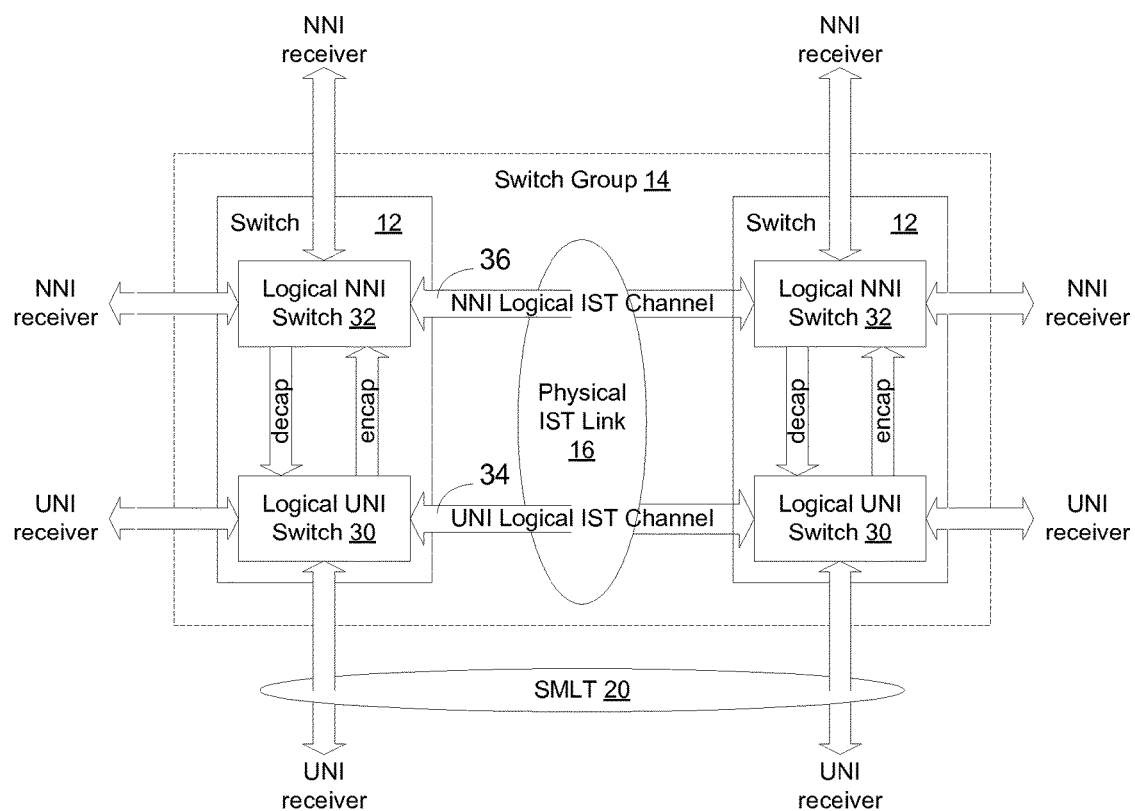
FIG. 2 is a functional block diagram of an example network element for use in the switch group such as the switch group of FIG. 1 according to an embodiment.

FIG. 2 shows the switch group 14 in greater detail. In particular, as shown in FIG. 2, each switch 12 of the switch group 14 is implemented as two logical switches. In particular, each switch is implemented as a logical UNI switch 30 and a logical NNI switch 32. The two logical switches exchange packets through UNI/NNI and NNI/UNI translations. The UNI switch provides standard L2 forwarding for attached UNI ports. For unicast packets entering the UNI switch and destined to an NNI port, the UNI switch will add a B-MAC header to the packet (encapsulation) and send it to the NNI switch where the packet is forwarded to the correct NNI port. The logical NNI switch provides standard SPB L2 forwarding for attached NNI ports. For unicast packets entering the NNI switch and destined to a UNI port, the NNI switch will remove the B-MAC header from the packet (decapsulation) and send it to the UNI switch where the packet is forwarded to the UNI port.

The Inter-Switch Trunk in the embodiment shown in FIG. 2 is implemented as two logical channels—a UNI logical IST channel 34 and a NNI logical IST channel 36. Traffic from both logical channels may be transmitted between the switches over the same physical ports, but will be handled differently by the switches 12 forming the switch group. In particular, the NNI logical channel is used to logically interconnect the logical NNI switches 32 such that SPB encapsulated traffic received on the IST is passed to the NNI logical switch. Likewise the UNI logical IST channel 34 is used to interconnect the logical UNI switches 30 such that unencapsulated traffic received on the ST will be provided to the UNI logical switch.

The SPB control plane considers each logical NNI switch in the cluster as an independent node. This enables each node in the NNI switch cluster to treat all traffic received on an NNI port the same, regardless of whether the NNI port is connected to the SPB network or to the NNI logical IST channel 36. By not distinguishing traffic received from the SPB network and IST traffic, the manner in which the logical NNI switch handles traffic is greatly simplified. To allow the nodes within the cluster to be distinguished from one another, each node in the cluster is assigned or configured with a Backbone Virtual Local Area Identification Number (B-VID). The B-VID, in Shortest Path Bridging (SPB) IEEE 802.1aq, is used to implement path selection.

When a broadcast packet is received at the logical NNI switch, the logical NNI switch will check to determine whether the broadcast packet has any UNI receivers, NNI receivers, both UNI and NNI receivers, or no receivers. If there are receivers on both NNI and UNI ports, the logical NNI switch will broadcast the packet to all appropriate NNI ports. In addition, in connection with the UNI receivers, the logical NNI switch will check to see if the packet B-VID matches the node B-VID. If there is a match, the logical NNI switch will make a copy of the packet, remove the B-MAC header, and send the decapsulated packet to the logical UNI switch. The logical UNI switch will then handle broadcasting the packet to all appropriate UNI ports as well as the IST port. If there is no B-VID match, then no copy is made and the packet is not sent to the logical UNI switch.

In one embodiment, a node may be considered to be a combination of a logical UNI switch and logical NNI switch. For example, in some implementations a given physical switch may be implementing multiple nodes as in the context of a virtual router context, such that an actual piece of hardware is implementing multiple sets of logical UNI/NNI combinations. The particular implementation will depend on the type of hardware virtualization in use.

If the logical NNI switch determines that there are only NNI receivers, the logical NNI switch will broadcast the packet to all appropriate NNI ports and not sent a copy to the UNI switch.

If the logical NNI switch determines that there are only UNI receivers, the logical NNI switch will not forward the packet on any NNI port. In connection with UNI receivers, the logical NNI switch will check to see if the packet B-VID matches the node B-VID. If there is a match, the logical NNI switch will make a copy of the packet, remove the B-MAC header, and send the decapsulated packet to the logical UNI switch. The logical UNI switch will then handle broadcasting the packet to all appropriate UNI ports as well as the IST port. If there is no B-VID match, then no copy is made and the packet is not sent to the logical UNI switch.

If the logical NNI switch determines that there are no receivers, the logical NNI switch will drop the packet.

At the logical UNI switch, when a broadcast packet is received, the logical UNI switch will check to determine whether the broadcast packet has any UNI receivers, NNI receivers, both UNI and NNI receivers, or no receivers. If there are receivers on both NNI and UNI ports, the logical UNI switch will broadcast the packet to all appropriate UNI ports as well as to the IST port. In addition, in connection with the NNI receivers, the logical UNI switch will make a copy of the packet, add a B-MAC header (encapsulation), and send the encapsulated packet to the logical NNI switch. The logical NNI switch will then handle broadcasting the packet to all appropriate NNI ports as described above. In particular, it may be expected that the logical NNI switch will only have NNI receivers, since the packet is being received from the UNI switch, and hence the NNI switch may simply broadcast the packet to all appropriate NNI receivers.

If the logical UNI switch determines that there are only UNI receivers, the logical UNI switch will broadcast the packet to all appropriate UNI ports as well as to the IST port.

If the logical UNI switch determines that there are only NNI receivers, the logical UNI switch will add a B-MAC header (encapsulation), and send the encapsulated packet to the logical NNI switch. The logical NNI switch will then handle broadcasting the packet to all appropriate NNI ports as described above.

If the logical UNI switch determines that there are no receivers, the logical UNI switch will drop the packet.

If the UNI switch receives a broadcast packet from an IST port, the logical UNI switch will determine whether it has receivers only on UNI ports. If so, the logical UNI switch will broadcast the packet to all the appropriate UNI ports only. If there are no receivers on the UNI ports, the logical UNI switch will drop the packet. If the logical UNI switch determines that it has receivers on NNI ports, the UNI switch will ignore receivers on the NNI ports as the packet will have previously been forwarded by the adjacent logical UNI switch to its logical NNI switch counterpart, which in turn will handle forwarding of the broadcast packet within the NNI realm.

By implementing the IST port as both UNI type and NNI type, and segregating processing at the UNI and NNI layers, it is possible to greatly simplify handling of broadcast traffic in a layer 2 switch cluster. Further, it enables a unique L2 forwarding mechanism for unicast and broadcast traffic within the SMLT/SPB cluster.

FIG. 3 shows an example process implemented by a network element such as the network element of FIG. 2 upon receipt of a broadcast packet at a logical NNI switch. As shown in FIG. 3, when a broadcast packet is received at a logical NNI switch 300, the manner in which the packet is handled will depend on whether the logical NNI switch has receivers that are of UNI type, NNI type, or both. As used herein, a User Network Interface (UNI) is a demarcation point between the responsibility of the service provider and the responsibility of the subscriber. This is distinct from a Network to Network Interface (NNI) that defines a similar interface between provider networks or between network elements in the same provider network.

If the logical NNI switch determines that there are only NNI receivers (302), i.e. that the logical NNI switch does not need to forward the broadcast packets to any UNI receivers, the logical NNI switch will broadcast the packet to all appropriate NNI ports (304). In this instance, since there are no UNI receivers, the logical NNI switch does not need to forward a copy of the packet to the logical UNI switch.

If the logical NNI switch determines that there are one or more UNI receivers only (306), the logical NNI switch will make a further determination as to whether the packet B-VID matches the B-VID assigned to the node (308). If not, the packet is dropped (310). If there is a B-VID match, the logical NNI switch will make a copy of the packet, remove the outer provider MAC header (B-MAC header) to decapsulate the packet, and send the decapsulated packet to the UNI switch for forwarding to the UNI receivers (312). Note, in this regard, that 802.1ah provides for Mac in Mac encapsulation such that a customer frame having a customer MAC header (C-MAC header) may be encapsulated by a provider upon entry into the provider network. This encapsulation process adds an outer MAC header commonly referred to as a B-MAC header. The logical NNI switch operates to switch packets based on this outer B-MAC header. The logical UNI switch, by contrast, operates to switch packets based on the customer C-MAC header. The decapsulation process enables the logical NNI switch to remove the outer B-MAC header in connection with forwarding the packet to the logical UNI switch for processing. [We have described the transmitting switch as doing the encap/decap processes. could the receiving switch do this instead?]

If the logical NNI switch determines that there are both NNI and UNI receivers for the packet, it will implement the processes described in both (304) and (308-312). Specifically, it will broadcast a copy of the packet to all appropriate NNI ports (316). In addition, the logical NNI switch will make a further determination as to whether the packet B-VID matches the B-VID assigned to the network element (318). If not, a copy of packet is not forwarded to the logical UNI switch (320). If there is a B-VID match, the logical NNI switch will make a copy of the packet, remove the outer provider MAC header (B-MAC header) to decapsulate the packet, and send the decapsulated packet to the UNI switch for forwarding to the receivers (322).

If the logical NNI switch determines that it has no receivers, it will drop the packet (324).

Although FIG. 3 has been illustrated as a flow chart, in operation the processes described in FIG. 3 may be condensed or implemented in any determined order. For example, when a packet is received, the logical NNI switch will determine a set of ports and automatically forward the packet on the set of determined NNI ports. If one or more of the set of determined ports is of UNI type, the logical NNI switch will determine whether there is a B-VID match and, if so perform decapsulation and forward the packet to the logical UNI switch. The determinations 302, 306, 314 are thus not required to be independently implemented or implemented in any particular order. Rather, in operation, a single lookup operation may condense multiple steps to achieve this same functionality. FIG. 3 has been illustrated, therefore, to describe at a high level the type of forwarding operations implemented by the logical NNI switch. The diagram is not intended to imply that the invention requires sequential implementation as an embodiment may implement these and other operations in other orders or in parallel depending on the nature of the hardware and software used in the implementation.

FIG. 4 shows an example process implemented by a network element such as the network element of FIG. 2 upon receipt of a broadcast packet at a logical UNI switch. As shown in FIG. 4, when a broadcast packet is received at a logical UNI switch 400, the manner in which the packet is handled will depend on whether the logical UNI switch has receivers that are of NNI type, UNI type, or both, as well on whether the packet was received on the IST or on a normal user port.

If the UNI switch receives a broadcast packet from an IST port (401), the logical UNI switch will determine whether it has receivers only on UNI ports. If so, the logical UNI switch will broadcast the packet to all the appropriate UNI ports only (402). If there are no receivers on the UNI ports, the logical UNI switch will drop the packet. If the logical UNI switch determines that it has receivers on NNI ports, the UNI switch will ignore receivers on the NNI ports as the packet will have previously been forwarded by the adjacent logical UNI switch to its logical NNI switch counterpart, which in turn will handle forwarding of the broadcast packet within the NNI realm.

If the logical UNI switch determines that the packet was not received on the IST port, the logical UNI switch will implement UNI and NNI forwarding. If there are only UNI receivers (403), i.e. that the logical UNI switch does not need to forward the broadcast packets to any NNI receivers, the logical UNI switch will broadcast the packet to all appropriate UNI ports (404). In this instance, since there are no NNI receivers, the logical UNI switch does not need to forward the packet to the logical NNI switch.

If the logical UNI switch determines that there are one or more NNI receivers only (406), the logical UNI switch will add an outer provider MAC header (B-MAC header) to encapsulate the packet, and send the encapsulated packet to the NNI switch for forwarding to the receivers (408).

If the logical UNI switch determines that there are both NNI and UNI receivers for the packet (410), it will implement the processes described in both (404) and (408). Specifically, it will broadcast a copy of the packet to all appropriate UNI ports (412). In addition, the logical UNI switch will make a copy of packet, add an outer provider MAC header (B-MAC header) to encapsulate the packet, and send the encapsulated packet to the NNI switch for forwarding to the receivers (414).

If the logical UNI switch determines that it has no receivers, it will drop the packet (416).

Although FIG. 4 has been illustrated as a flow chart, in operation the processes described in FIG. 4 may be condensed or implemented in any determined order. For example, as discussed above in connection with FIG. 3, in operation when a packet is received the logical UNI switch will perform a lookup operation to determine a set of receivers for the packet. The logical UNI switch will then forward the packet on any determined UNI ports and perform the encapsulation process and forward the packet to the logical NNI switch for handling when it is determined that the set of receivers includes one or more NNI ports. The determinations 402, 406, 410 are thus not required to be independently implemented or implemented in any particular order. Rather, in operation, a single lookup operation may condense multiple steps to achieve this same functionality. FIG. 4 has been illustrated, therefore, to describe at a high level the type of forwarding operations implemented by the logical UNI switch. The diagram is not intended to imply that the invention requires sequential implementation as an embodiment may implement these and other operations in other orders or in parallel depending on the nature of the hardware and software used in the implementation.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for layer 2 forwarding of packets within a first node of a multi-node switch cluster, the method comprising the steps of:

implementing a logical User to Network Interface (UNI) switch in the first node of the multi-node switch cluster to handle layer 2 forwarding of packets within the first node between UNI ports on the first node, the logical UNI switch including a plurality of UNI ports on the first node and no NNI ports on the first node; and implementing a logical Network to Network Interface (NNI) switch in the first node of the multi-node switch cluster to handle layer 2 forwarding of packets within the first node between NNI ports on the first node, the logical NNI switch including a plurality of NNI ports on the first node and no UNI ports on the first node;

wherein the logical UNI switch and logical NNI switch are independently controlled switching processes within the first node, and wherein the logical UNI switch and logical NNI switch are configured to forward copies of packets to each other within the first node.

2. The method of claim 1, wherein the logical UNI switch and UNI ports are on a first network.

3. The method of claim 2, wherein the first network implements a first network control plane.

4. The method of claim 3, wherein the logical UNI switch is treated as an independent switch in the first network control plane.

5. The method of claim 4, wherein the logical NNI switch does not participate in the first network control plane.

6. The method of claim 2, wherein the logical NNI switch and NNI ports are on a second network.

7. The method of claim 6, wherein the second network implements a second network control plane, the second network control plane being separate from the first network control plane.

8. The method of claim 7, wherein the logical NNI switch is treated as an independent switch in the second network control plane.

9. The method of claim 8, wherein the logical UNI switch does not participate in the second network control plane.

10. The method of claim 1, wherein the logical NNI switch is implemented as a Backbone Edge Bridge in Ethernet standard 802.1ah.

11. The method of claim 1, wherein the logical UNI switch is attached to at least one link of a multi-link trunk.

12. The method of claim 1, further comprising the step of implementing an inter-switch trunk, the inter-switch trunk including a UNI logical channel for traffic exchanged by the logical UNI switch with other nodes of the switch cluster, the inter-switch trunk also including a NNI logical channel for traffic exchanged by the logical NNI switch with other nodes of the switch cluster.

13. The method of claim 1, further comprising the steps of receiving a packet by the logical UNI switch on a port other than an IST port, determining by the logical UNI switch a set of UNI receivers to receive the packet, determining that there are no NNI receivers that need to receive the packet, and forwarding the packet to a set of UNI ports associated with the set of UNI receivers and on the IST port and not to the logical NNI switch.

14. The method of claim 1, further comprising the steps of receiving a packet by the logical UNI switch on an IST port, determining by the logical UNI switch a first set of UNI receivers to receive the packet and a second set of NNI receivers to receive the packet, and forwarding the packet only to a first set of UNI ports associated with the first set of UNI receivers and not to the logical NNI switch.

15. The method of claim 1, further comprising the steps of receiving a packet by the logical UNI switch on a port other than an IST port, determining by the logical UNI switch a first set of UNI receivers to receive the packet and a second set of NNI receivers to receive the packet, forwarding the packet to a first set of UNI ports associated with the first set of UNI receivers, and forwarding a copy of the packet to the logical NNI switch.

16. The method of claim 15, further comprising the step of encapsulating the packet in connection with forwarding the copy of the packet to the logical NNI switch.

17. The method of claim 1, further comprising the steps of receiving a packet by the logical NNI switch, determining by the logical NNI switch a set of NNI receivers to receive the packet, determining that there are no UNI receivers that need to receive the packet, and forwarding the packet to a set of NNI ports associated with the NNI receivers and not to the logical UNI switch.

18. The method of claim 1, further comprising the steps of receiving a packet by the logical NNI switch, determining by the logical NNI switch a set of UNI receivers to receive the packet, determining by the logical NNI switch a network virtualization identifier (B-VID) associated with the packet, and forwarding the packet to the logical UNI switch if the network virtualization identifier matches a value previously associated with the logical NNI switch.

19. The method of claim 18, further comprising the step of not forwarding the packet to the logical UNI switch if the network virtualization identifier does not match the value previously associated with the logical NNI switch.

20. The method of claim 18, further comprising the step of decapsulating the packet in connection with forwarding the copy of the packet to the logical UNI switch.

21. The method of claim 18, further comprising the steps of determining by the logical NNI switch a second set of NNI receivers to receive the packet, and forwarding the packet to a second set of NNI ports associated with the NNI receivers.

22. The method of claim 1, wherein the logical UNI switch and logical NNI switch are configured to forward copies of packets to each other through UNI/NNI and NNI/UNI translations.

* * * * *